US012643393B2

(12) United States Patent

Hung et al.

(10) Patent No.: US 12,643,393 B2

(45) Date of Patent: Jun. 2, 2026

(54) ACTIVE AIR INTAKE SHUTTER SYSTEM

(71) Applicant: VENTRA GROUP, CO., Halifax (CA)

(72) Inventors: Joaquin Hung, Markham (CA);
Michael Engle, Grosse Pointe Woods,
MI (US); Zackary Bucki, South
Rockwood, MI (US)

(73) Assignee: VENTRA GROUP, CO., Halifax (CA)

( * ) Notice: Subject to any disclaimer, the term of this
patent is extended or adjusted under 35
U.S.C. 154(b) by 275 days.

(21) Appl. No.: 18/642,166

(22) Filed: Apr. 22, 2024

(65) Prior Publication Data

US 2024/0351429 A1      Oct. 24, 2024

Related U.S. Application Data

(60) Provisional application No. 63/497,655, filed on Apr.
21, 2023.

(51) Int. Cl.
B60K 11/08            (2006.01)

(52) U.S. Cl.
CPC ................................. B60K 11/085 (2013.01)

(58) Field of Classification Search
CPC .................................................... B60K 11/085
See application file for complete search history.

(56) References Cited

U.S. PATENT DOCUMENTS 8,807,629 B2      8/2014  Benvenuto et al.
9,039,068 B2      5/2015  Niemi et al.

9,764,706 B2      9/2017  Benvenuto et al.
10,017,048 B2     7/2018  Manhire
10,384,730 B2     8/2019  Klop et al.
10,787,141 B2     9/2020  Vacca et al.
10,900,409 B2     1/2021  Clapie et al.
(Continued)

FOREIGN PATENT DOCUMENTS

DE      102009052372 A1      5/2011
DE      102018004361 A1      12/2019
(Continued)

OTHER PUBLICATIONS

Extended European Search Report dated Mar. 27, 2025, issued in
corresponding European Patent Application No. 24205255.3 (8
pgs.).

*Primary Examiner* — Edwin A Young
(74) *Attorney, Agent, or Firm* — CUSHMAN
PARTNERS, LLC

(57)            ABSTRACT

An active vehicle air intake shutter system for installation at
first and second air intake openings on a front end of a motor
vehicle that are angled relative to one another in both
rearward and lateral directions. The system includes first and
second intake shutter assemblies for mounting at the intake
openings. A lateral shaft has first and second shaft couplings
each oriented axially with respect to the shaft axis, that
connect, respectively, to a first coupling of the first intake
shutter assembly at an angle to define a first angled joint that
transfers pivotal movement therebetween without changing
the angle therebetween, and a second coupling of the second
intake shutter assembly at an angle to define a second such
angled joint. An actuator pivots the first and second cou-
plings simultaneously between open and closed positions
via the shaft and the first and second angled joints.

10 Claims, 9 Drawing Sheets

(56) References Cited

U.S. PATENT DOCUMENTS

| | | | |
|---|---|---|---|
| 11,072,378 B2 | 7/2021 | Klob et al. | |
| 2013/0223980 A1 | 8/2013 | Pastrick et al. | |
| 2014/0273806 A1* | 9/2014 | Frayer, III | B60K 11/085 |
| | | | 454/335 |
| 2019/0118643 A1* | 4/2019 | Momii | B60K 11/085 |
| 2020/0406741 A1* | 12/2020 | Totsuka | B60K 11/085 |
| 2021/0061373 A1 | 3/2021 | Guyon | |
| 2023/0174171 A1 | 6/2023 | Hung et al. | |
| 2024/0123817 A1* | 4/2024 | Yoon | B60K 11/085 |
| 2024/0317042 A1* | 9/2024 | Hall | B60K 11/085 |

FOREIGN PATENT DOCUMENTS

| | | | |
|---|---|---|---|
| DE | 102020108797 A1 | 10/2020 | |
| EP | 102009052372 A1 | 5/2011 | |
| EP | 3638531 B1 | 8/2021 | |

* cited by examiner

ACTIVE AIR INTAKE SHUTTER SYSTEM

CROSS-REFERENCE TO RELATED APPLICATIONS

The present application claims priority to U.S. Provisional Application No. 63/497,655, filed Apr. 21, 2023, the subject matter of which is incorporated herein by reference in its entirety.

FIELD OF THE INVENTION

The present application relates to an active vehicle air intake shutter system for installation at first and second air intake openings on a front end of a motor vehicle.

BACKGROUND OF THE INVENTION

Shutter systems are known for installation in air intake openings located at the front end of the vehicle. Typical shutter systems, also called AGS systems (active grill shutter systems), are not well-designed for vehicles with front ends aerodynamically curved in the lateral direction, particularly where the air intakes are angled relative to one another and the centerline of the vehicle. As vehicles are being aerodynamically contoured more aggressively to improve energy efficiency (e.g., fuel efficiency in a gasoline engine vehicle, or battery energy efficiency in an electric vehicle—or both in in a hybrid vehicle), this issue becomes more challenging. The angling makes driven connection of multiple systems for synchronous operation challenging and more expensive.

Examples include U.S. Pat. Nos. 10,017,048, 10,900,409, and 10,787,141 and U.S. Patent Pub. 2013/0223980, the entirety of each of which is incorporated herein by reference.

SUMMARY OF THE INVENTION

One aspect of the present application provides an active vehicle air intake shutter system for installation at first and second air intake openings on a front end of a motor vehicle. The openings are angled relative to one another to extend in both the rearward and lateral directions of the vehicle. The system comprises a first intake shutter assembly for mounting at the first air intake opening. The first intake shutter assembly is constructed to be movable between a closed position blocking airflow through the first air intake opening and an open position permitting airflow through the first air intake opening. The first intake shutter assembly has a first coupling such that pivotal movement of the first coupling moves the first intake shutter assembly between the open and closed positions. The system also comprises a second intake shutter assembly for mounting at the second air intake opening. The second intake shutter assembly is constructed to be movable between a closed position blocking airflow through the second air intake opening and an open position permitting airflow through the second air intake opening. The second intake shutter assembly has a second coupling such that pivotal movement of the second coupling moves the second intake shutter between the open and closed positions.

A shaft has an axis for extending in the lateral direction of the vehicle. The shaft comprises a first shaft coupling and a second shaft coupling each oriented axially with respect to the shaft axis. The first shaft coupling is configured to connect to the first coupling of the first intake shutter assembly at an angle to define a first angled joint wherein the first shaft coupling and the first coupling transfer pivotal movement therebetween without changing the angle therebetween. The second shaft coupling is configured to connect to the second coupling of the second intake shutter assembly at an angle to define a second angled joint wherein the second shaft coupling and the second coupling transfer pivotal movement therebetween without changing the angle therebetween. An actuator is configured to pivot the first and second couplings of the first and second intake shutter assemblies, respectively, such that the first and second couplings are pivoted simultaneously via the shaft and the first and second angled joints to move the first and second intake shutter assemblies between the open and closed positions thereof.

Another aspect of the invention provides a motor vehicle comprising a front end with first and second air intake openings, the openings being angled relative to one another to extend in both the rearward and lateral directions of the vehicle, and an active vehicle air intake shutter system installed at the first and second air intake openings. The active vehicle air intake shutter system comprises a first intake shutter assembly mounted at the first air intake opening. The first intake shutter assembly is movable between a closed position blocking airflow through the first air intake opening and an open position permitting airflow through the first air intake opening. The first intake shutter assembly has a first coupling connected such that pivotal movement of the first coupling moves the first intake shutter assembly between the open and closed positions. A second intake shutter assembly is mounted at the second air intake opening. The second intake shutter assembly is movable between a closed position blocking airflow through the second air intake opening and an open position permitting airflow through the second air intake opening. The second intake shutter assembly has a second coupling such that pivotal movement of the second coupling moves the second intake shutter assembly between the open and closed positions.

A shaft has an axis extending in the lateral direction of the vehicle. The shaft comprises a first shaft coupling and a second shaft coupling each oriented axially with respect to the shaft axis. The first shaft coupling is connected to the first coupling of the first intake shutter assembly at an angle to define a first angled joint wherein the first shaft coupling and the first coupling transfer pivotal movement therebetween without changing the angle therebetween. The second shaft coupling is connected to the second coupling of the second intake shutter assembly at an angle to define a second angled joint wherein the second shaft coupling and the second coupling transfer pivotal movement therebetween without changing the angle therebetween. An actuator is configured to pivot the first and second couplings of the first and second intake shutter assemblies, respectively, such that the first and second couplings are pivoted simultaneously via the shaft and the first and second angled joints to move the first and second intake shutter assemblies between the open and closed positions thereof.

Other objects, aspects and advantages of the present application will become apparent from the following detailed description, the accompanying drawings, and the appended claims.

DETAILED DESCRIPTION OF THE ILLUSTRATED EMBODIMENTS(S)

Figure 1:
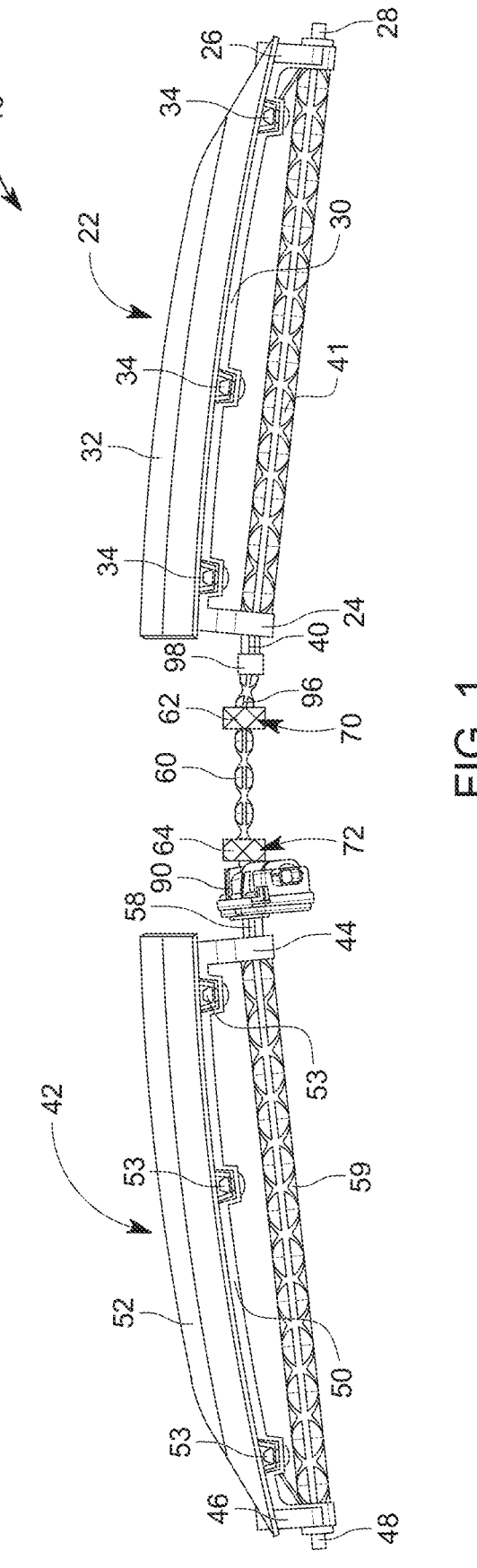
FIG. 1 is a top view of an active vehicle air intake shutter system in accordance with an embodiment of the application.

An active vehicle air intake shutter system 10 is provided for installation at first and second air intake openings 12, 14 on a front end 16 of a motor vehicle 18. The motor vehicle 18 may be of any type, such as a passenger vehicle, pick-up truck, over the road tractor, etc. Any vehicle that has an engine, electric motor, radiator, heat exchange system, electronics, or other internal components that may benefit from air intake for cooling or provision of air for certain functions may use the air intake shutter system 10 and the type of vehicle is not intended to be limiting.

The vehicle front end 16 may be of any construction or configuration, and the air intake openings 12, 14 may be provided in any part of the front end 16 that faces generally forwardly such that air is taken into the openings 12, 14 as the vehicle is driven forwardly. Of course, air may flow into the openings 12, 14 while the vehicle is stationary, but substantially more air is typically forced into the openings during forward travel of the vehicle. For example, the openings 12, 14 may be formed in the main body structure of the vehicle front end 16, or the bumper attached to the main body structure may have the openings 12, 14. In the illustrated embodiment, the openings 12, 14 are formed in a central part of a bumper 20 mounted below the main front end fascia structure. The specific structure of the vehicle front end 16 where the air intake openings 12, 14 are located is not intended to be limiting and any location may be used.

The openings 12, 14 are angled relative to one another to extend in both the rearward and lateral directions of the vehicle. The lateral direction of the vehicle 18 is also often referred to as the cross-body direction, and is perpendicular to the longitudinal direction of the vehicle 18, which is often referred to as the front-to-rear, fore-aft, front-to-back or front-to-rear direction or axis. The openings 12, 14 are angled relative to one another due to the shape of the vehicle front end 16. Specifically, a vehicle front end 16 may be rounded/bowed or angled so as to curve or angle laterally and rearwardly, typically to make the vehicle front end 16 more aerodynamic (as opposed to having a straighter or more flattened shape in the direction of vehicle travel). As energy efficiency becomes more of a concern in the industry, more aggressive front end curvatures have become more common. The shape of the front end 16 is not intended to be limiting, and may have any configuration where an angle between the openings 12, 14 is created. The openings 12, 14 themselves also may have curvature in the lateral direction following a curvature of the part on the vehicle front end 16 on which they are located. The openings 12, 14 likewise may be straight or linear with no curvature, meaning they are angled but the lengthwise direction of the openings 12, 14 is straight. The height or vertical direction of the openings 12, 14 may also be straight/linear or curved. Thus, the particular shape of the openings 12, 14 is not intended to be limiting.

The system 10 comprises a first intake shutter assembly 22 for mounting at the first air intake opening 12. In the illustrated embodiment, the first intake shutter assembly 22 is movable between a closed position blocking airflow through the first air intake opening 12 and an open position permitting airflow through the first air intake opening 12. The first intake shutter assembly 22 has a first coupling 36 discussed below such that pivotal movement of the first coupling 36 moves the first intake shutter assembly 22 between the open and closed positions.

Figure 7:
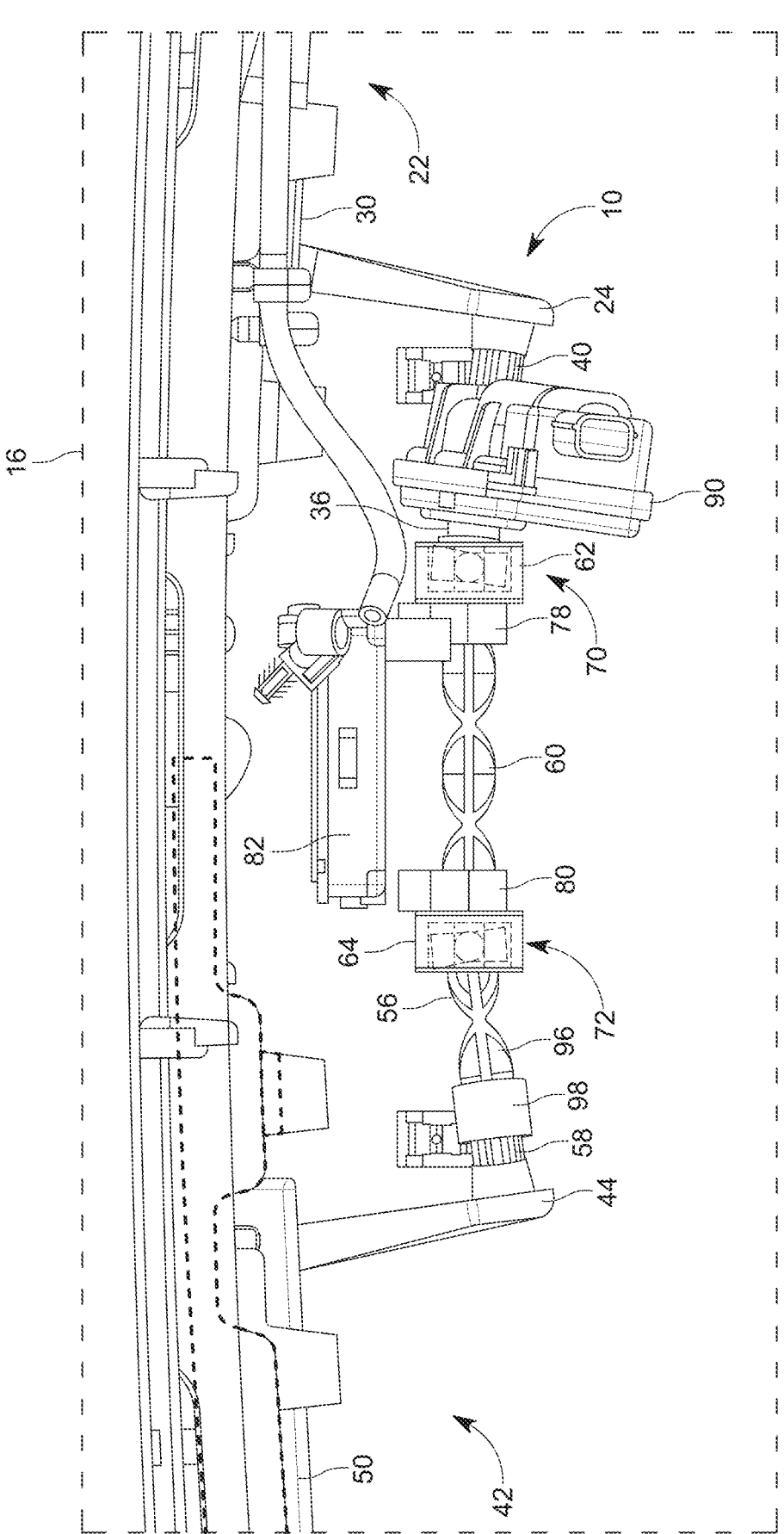
FIG. 7 is a top view of the system of FIG. 1 in closer detail and installed in a vehicle front end, with the actuator being on the opposite side.
Figure 8:
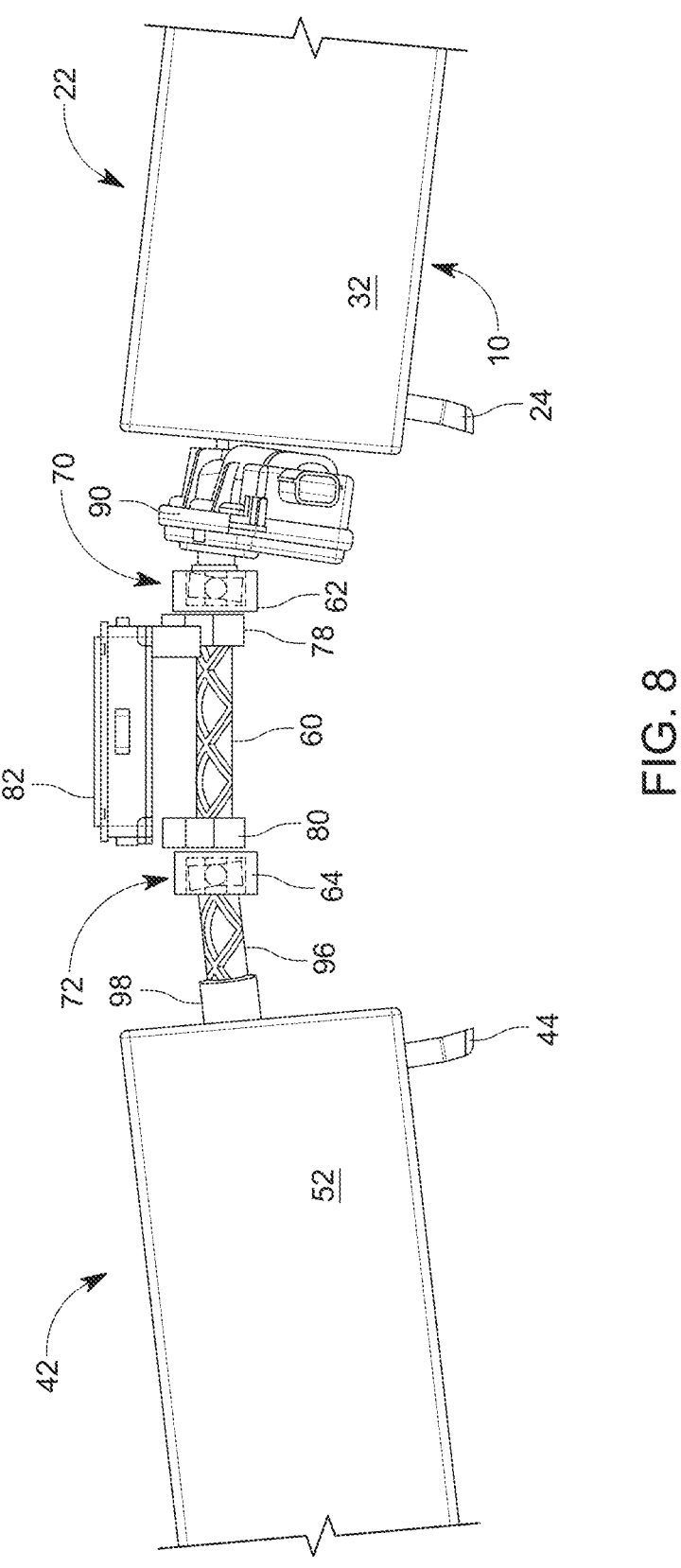
FIG. 8 is a view similar to FIG. 7 with the vehicle structure removed to show the shutters pivoted to the open position.

In the non-limiting illustrated embodiment, the first intake shutter assembly 22 includes an inner control arm 24 at the inboard end thereof and an outer control arm 26 with a pivotal connector 28 at the outboard end thereof, which is pivotally connected to any suitable structure on the vehicle front end 16 directly or indirectly. The pivot axis of the shutter assembly 22 extends laterally and at a rearward angle to the vehicle, as best appreciated from the top views of FIGS. 1, 7 and 8. FIG. 7 illustrates the angle as 7.83 degrees, but any angle may be used.

In the illustrated embodiment, first intake shutter assembly 22 has a mounting bracket 30 that extends between the control arms 24, 26. The mounting bracket 30 may be configured to follow the curvature of the vehicle front end 16 over the area where it extends. A fascia shutter panel 32 is mounted to the mounting bracket 30. In the illustrated embodiment, the fascia shutter panel 32 is designed to have the same appearance as the exterior of the vehicle front end 16. That is, it has the same color and curvature to better blend into the vehicle front end 16 and appear more continuous from an aesthetics standpoint. The fascia shutter panel 32 is mounted to the mounting bracket 30 by a series of fasteners 34, such as snap-fit connectors, screws, bolts, or other suitable fasteners, inserted in openings at the upper edge of the mounting bracket 30. The lower edge of the fascia shutter panel 32 may have an upwardly turned edge forming a lip 38 that receives the lower edge of the mounting bracket 30. The use of a mounting bracket 30 and shutter panel 32 is optional to enable shutter panels of different external appearance, such color, surface texture, shape, etc. to be used more flexibly with the same underlying mounting bracket 30. However, the bracket 30 and shutter panel 32 could be one integral unit or the shutter 32 may be used without the bracket 30 and the structure for making the connections may be part of the shutter panel 32, particularly if surface variations are not an issue.

The control arm 24 also has an input coupling 40, discussed below, that receives pivotal movement/torque for pivoting the first intake shutter assembly 22 between the open and closed positions. The input coupling 40 may have a spur gear configuration as shown in the illustrated embodiment, but may have any configuration. The first intake shutter assembly 22 may also have an optional shaft 41 extending between the control arms 24, 26 along the pivotal axis of the assembly 22, which is advantageous for improved positive transfer of pivotal torque to the outer control arm 26. The shaft 41 also helps provide added torsional resistance to the outer control arm 26 pivoting away from the closed position due to the force of air against the fascia shutter panel 32 during vehicle movement.

The system also comprises a second intake shutter assembly 42 for mounting at the second air intake opening 14. The second intake shutter assembly 42 is also movable between a closed position blocking airflow through the second air intake opening 14 and an open position permitting airflow through the second air intake opening 14. The second intake shutter assembly 42 has a second coupling 56 connected such that pivotal movement of the second coupling 56 moves the second intake shutter assembly 42 between the open and closed positions.

The second intake shutter assembly 42 has the same basic construction as the first intake shutter assembly 22, but has a basically mirrored or opposite design because it is on the other side of the vehicle centerline in the illustrated embodiment. The pivot axis of the second intake shutter assembly 42 also extends laterally and at a rearward angle to the vehicle, as best appreciated from the top views of FIGS. 1, 7 and 8. Thus, the second intake shutter assembly includes an inner control arm 44 at the inboard end thereof, an outer control arm 46 with a pivotal connector 48, a mounting bracket 50 that extends between the control arms 44, 46, a fascia shutter panel 52 mounted to the mounting bracket 50 by fasteners 53 and a lip 54, an input coupling 58 on the control arm 44, and a shaft 59. The discussion of all these components for the first intake shutter assembly 22 applies equally to the corresponding components of the second intake shutter assembly 42. For convenience, the components of the first intake shutter assembly 22 may be referred with the label "first" and the components of the second intake shutter assembly 42 may be referred to with the label "second" to differentiate between them when they are discussed together. The terms first and second as used herein are only for differentiation and clarity and have no limiting significance beyond requiring at least two shutter assemblies. The first intake shutter assembly 22 and its intake 12 are on the passenger side and the second intake shutter assembly 42 and its intake 14 are on the driver side (in a North American vehicle) in the illustrated embodiment, but either side can be referred to as the first or the second, and likewise they can also be referred to as right and left (or passenger and driver side, understanding those sides may vary depending on the geographical market).

In the illustrated embodiment, each intake shutter assembly 22, 42 has a single shutter panel 32, 52 with a size/shape corresponding to the intake openings 12, 14, but that is not limiting. The shutter panels 32, 52 are shown as being used on intake openings 12, 14 that have grills and the shutter panels 32, 52 are positioned behind the grills in the closed position, but that is also not limiting and the intake openings 12. 14, could be fully open with no grills or other structure therein. Hence, although these systems are often referred to as AGS systems (active grill shutter systems), the presence of a grill is not technically required despite the general term used, and a design where no grillwork is present may still be considered in the AGS category. In some embodiments, the fascia panels 32, 52 could also be positioned to be flush or continuous with the exterior surface of the vehicle front end 16 in the closed position, and thus may be a continuous part of the vehicle exterior surface. Moreover, the particular structure of the shutter assemblies 22, 42 in general is an example and not limiting in any aspect.

For example, in other embodiments, each shutter assembly could have multiple, smaller shutters that are joined to move together (also referred to as louvers), such as is shown in references cited in the Background Section. Using the angled joint of the present application discussed below, such intake shutter assemblies can be oriented at the lateral and rearward angle with a lateral extending shaft therebetween in which an angled joint for each shutter assembly provides the pivotal transfer of motion and all the shutters of each assembly open/close together. Thus, the present application is not limited to embodiments where the intake shutter assemblies have a single shutter.

When a shutter assembly 22, 42 is in a closed position blocking airflow into the air intake 12, 14, a perfect seal is not required, and being closed to block airflow means that a sufficient portion of the airflow is blocked from flowing into the vehicle front end 16. Likewise, when a shutter assembly 22, 42 is in a closed position permitting airflow into the air intake, a completely unobstructed airflow is not required and being open to permit airflow means the air intake 12, 14 is opened to permit a sufficiently high amount of airflow into the vehicle front end 16. A person of ordinary skill in the art would readily understand what open and closed means, and understands that neither perfect sealing nor perfect lack of obstruction is needed to be consider closed or open, respectively.

A shaft 60 has an axis for extending in the lateral direction of the vehicle 18. The shaft 60 comprises a first shaft coupling 62 and a second shaft coupling 64 each oriented axially with respect to the shaft axis. The shaft 60 has sufficient torsional rigidity suitable for its pivotal transfer function discussed below and may have any suitable construction or made of any suitable material. The illustrated shaft 60 has central web 66 of rectangular shape and cross-section with a series of reinforcing ribs 68 to provide rigidity against torsional deflection, with less weight than a solid shaft of the same size. The illustrated shaft 60 may be made of plastic or any other material, and may be molded. The use of ribs 68 allows the shaft 60 to have less weight, while providing suitable torsional rigidity. However, any other shaft may be used, including a straight cylindrical or tubular shaft, a multi-part shaft or a shaft of any other configuration, and thus the lighter weight version illustrated is advantageous but not intended to be limiting. This ribbed construction may also be used as an option on the shafts 41, 59 of the shutter assemblies 22, 42 and the shaft 96 (discussed below) as illustrated.

A shaft is advantageous over drive connections with low torsional rigidity, like drive cables. While drive cables are highly flexible for installation because they can be routed quite easily, their very small cross-section relative to their length make them generally unsuitable for providing suitable torsional rigidity. Moreover, torsional deflection occurring in the cable can introduce lag in the opening or closing action, as some of the pivoting motion results in cable twisting (torsional deflection) prior to positive opening/closing action of the shutter. In addition, they tend to be expensive in comparison to a shaft.

Figure 5:
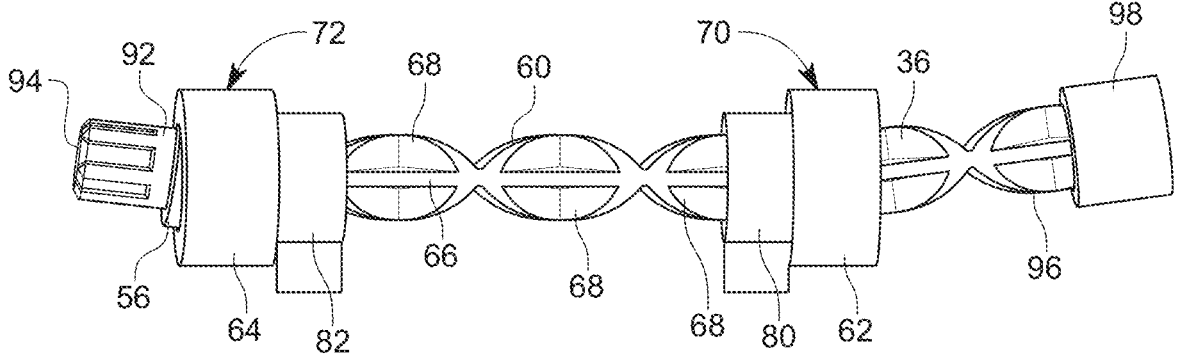
FIG. 5 illustrates the shaft, bushings and couplings associated with providing angled joints.
Figure 6:
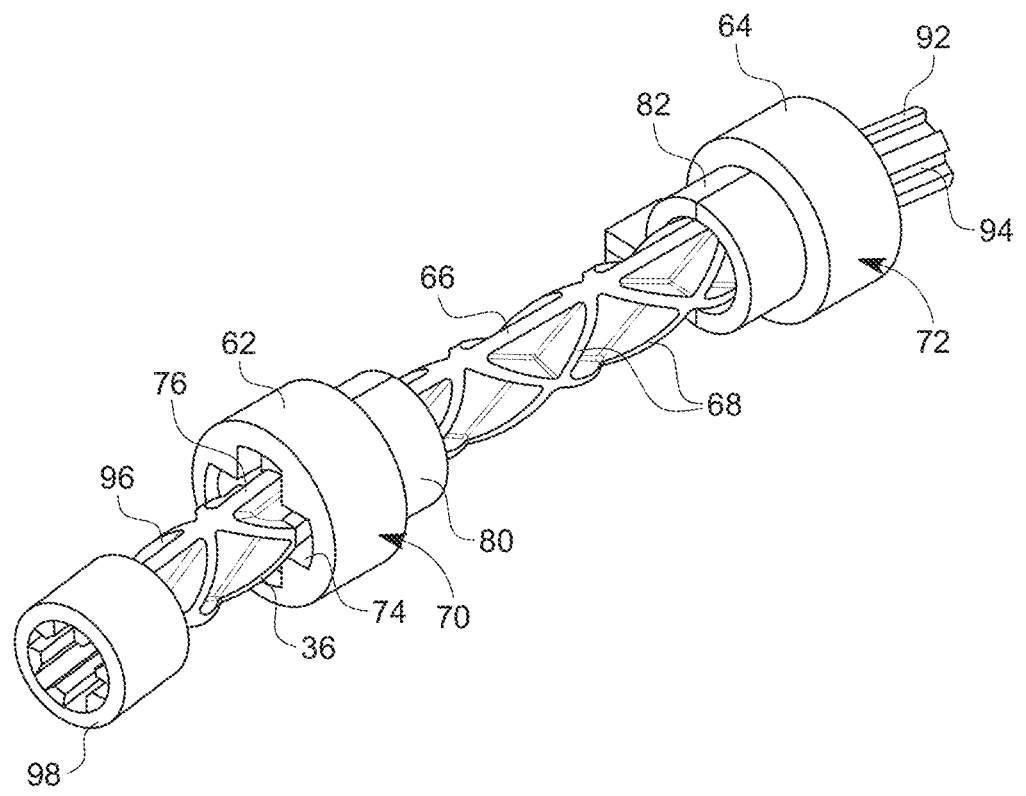
FIG. 6 is another view illustrating the shaft, bushings and couplings associated with providing angled joints.

As shown in closer detail in FIGS. 5 and 6, the first shaft coupling 62 is configured to connect to the first coupling 36 of the first intake shutter assembly at an angle to define a first angled joint 70 wherein the first shaft coupling 62 and the first coupling 36 transfer pivotal movement therebetween without changing the angle therebetween. That is, when the first coupling 36 and the first shaft coupling 62 are each pivoting about their respective axes, the angle between their respective axes remains the same and thus the pivotal movement is transferred therebetween even while they remain angled with respect to one another. The first shaft coupling 62 may be formed integrally with the shaft 60 or may be separately attached to the end of the shaft 60.

Similarly, the second shaft coupling 64 is configured to connect to the second coupling 56 of the second intake shutter assembly 42 at an angle to define a second angled joint 72 wherein the second shaft coupling 64 and the second coupling 56 transfer pivotal movement therebetween without changing the angle therebetween. Like with the first coupling 36 and the first shaft coupling 62, when the second coupling 56 and the second shaft coupling 64 are each pivoting about their respective axes, the angle between their respective axes remains the same and thus the pivotal movement is transferred therebetween even while they remain angled with respect to one another. The second shaft coupling 64 may also be formed integrally with the shaft 60 or may be separately attached to the end of the shaft 60.

The use of these angled joints 70, 72 enables the shaft 60 to be oriented in the lateral direction of the vehicle 18, while the first and second couplings 36, 56 can be oriented at their respective angles due to the first and second intake shutter assemblies 22, 42 being mounted at the angled intake openings 12, 14. This provides for the angle between the pivot axes of the shaft 60 and the first and second shutter assemblies 22, 42. The use of a shaft 60 enables for positive transfer of the pivoting movement and simultaneous opening/closing of both intake shutter assemblies 22, 42. It also provides for positive retention of both intake shutter assemblies 22, 42 in the closed position against the force of air acting on the shutter panels 32, 52, with the actuator 90 discussed below providing resistance against pivotal movement.

In the illustrated embodiment, the first and second angled joints 70, 72 are each a constant velocity joint (also called CV joints for short in mechanics). For example, in the illustrated embodiment, each of the first and second shaft couplings 62, 64 has an X-shaped female connector 74 defined by a pair of perpendicular slots on an axial face thereof. Also, each of the first and second couplings 36, 56 of the first and second intake shutter assemblies has an X-shaped male connector 76 for being slidably received in the respective X-shaped female connector 74 to maintain the angle of the respective angled joint 70, 72. The axial edges of the X-shaped male connector 76 may be rounded (i.e., curved about a radial axis perpendicular thereto) to facilitate the tilting movement for maintaining the angle as the joint 70, 72 pivots. The axially facing inner walls of the X-shaped female connector 74 may be correspondingly shaped with such curvature also. The X-shapes also provide for pivotal transfer of the force, and the X-shapes enable movement with a radial component with respect to each axis to enable the angle to be maintained between each set of engaged couplings 36/62 and 56/64 while still transferring the pivotal movement at the same angular rate between the engaged couplings. The male/female connectors may be reversed. Also, other configurations may be used to create the angled joints 70, 72, and the illustrated embodiment is not intended to be limiting.

A non-limiting advantage of the angled joints, such as the example illustrated, is that they can accommodate variances in the angle without the need for a design change. Using the 7.83 degree angle in FIG. 7 as an example, the same design could accommodate a shallower angle (e.g. 5 degrees) or a steeper angle (e.g., 10 degrees) without a need to change the design. This may be advantageous if the vehicle OEM opts to alter the vehicle front end curvature, as altering the system 10 would not be needed. Likewise, for vehicle model lines that have different sizes (and thus may have different front ends), the ability for the same system 10 to be installed with the angled joints at different angles (and thus the shutter assemblies at different angles) allows the same system 10 to be used across different model sizes (or even different models entirely). If there are other variations, the system 10 is readily updated to accommodate them. For example, if the distance between the air intakes of two vehicles is different, the same basic system 10 can be used with different length shafts 60. Similarly, if the air intake configurations are different, different shutter panels 32, 52 may be substituted (or for more significant differences, different shutter assemblies 22, 42).

Figure 2:
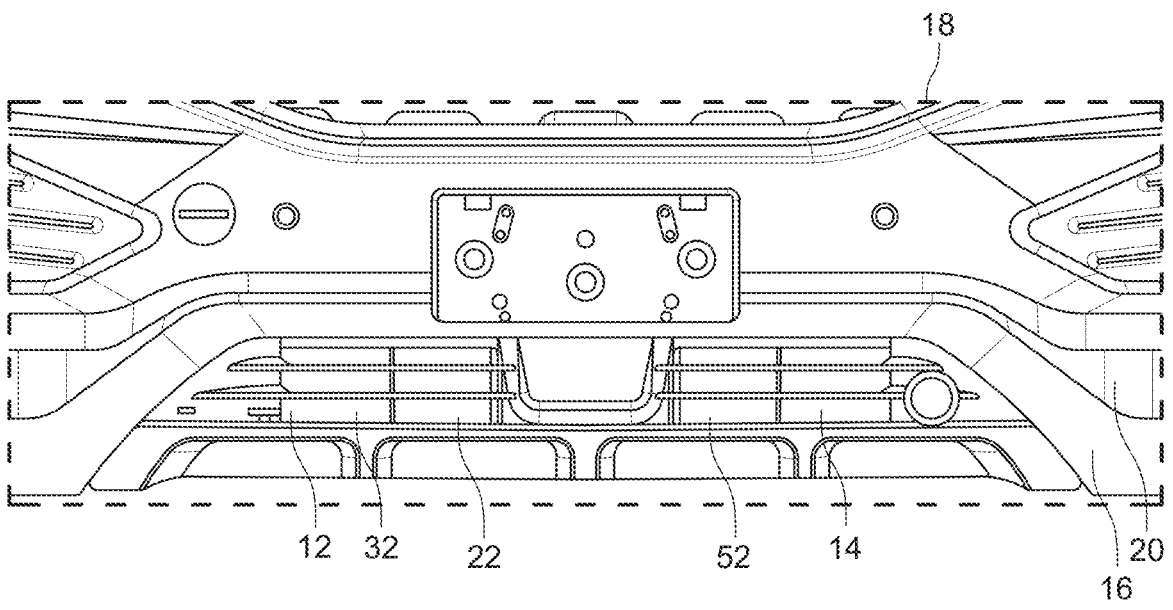
FIG. 2 is a front view of an example motor vehicle front end with the system of FIG. 1 showing the shutters in a closed position.
Figure 3:
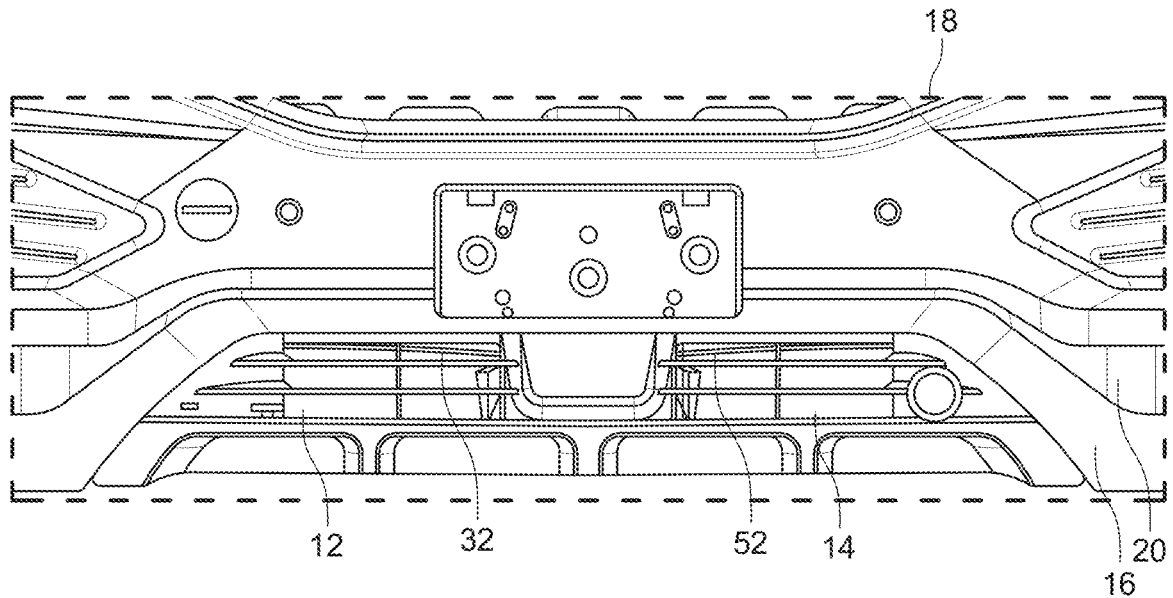
FIG. 3 is the view of FIG. 2 with the shutters in the open position.
Figure 4:
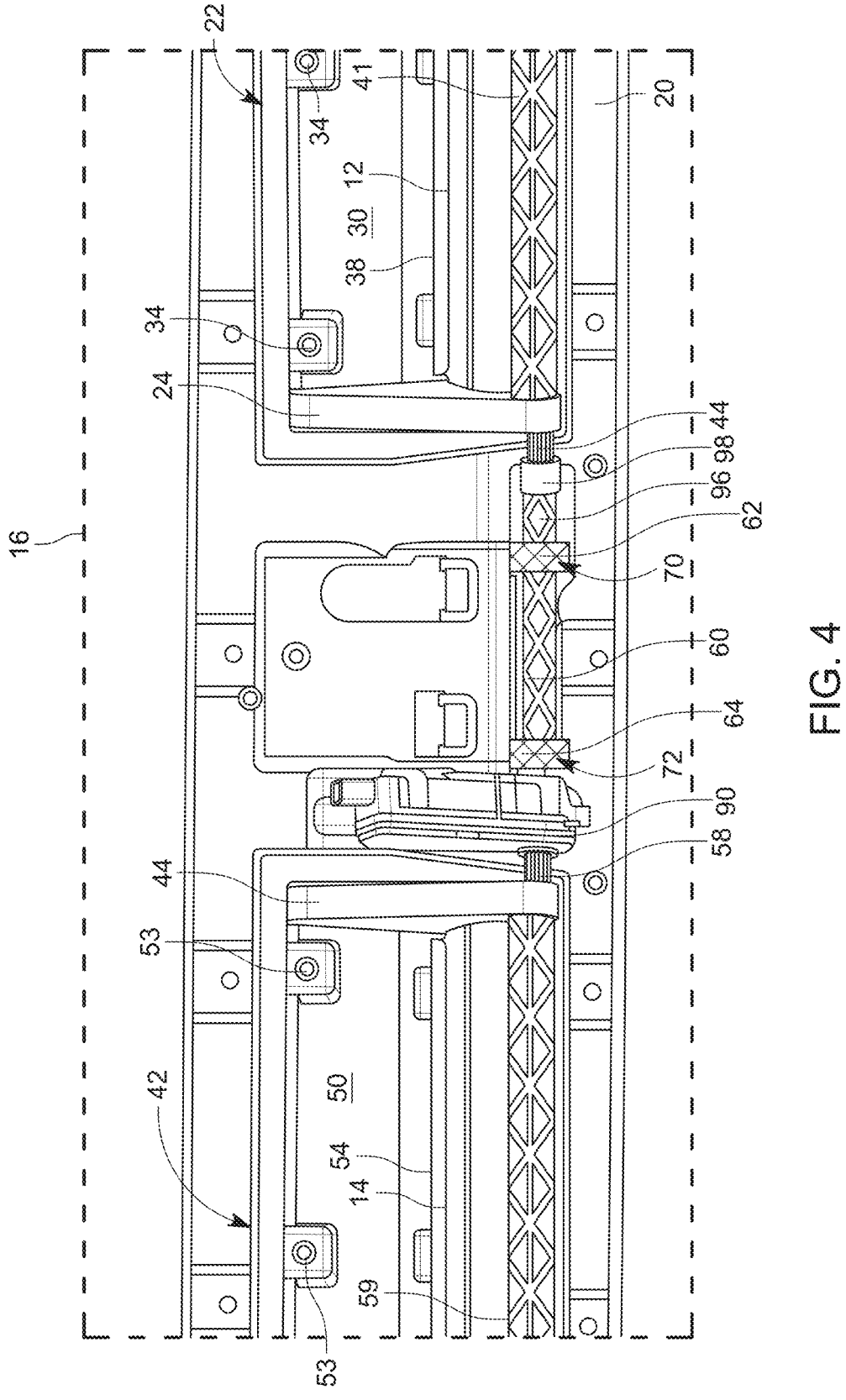
FIG. 4 is a rear view from the inside of the vehicle showing the central region of the system of FIG. 1 in closer detail.

In the illustrated embodiment, a pair of bushings 78, 80 may optionally be used to secure the location of the shaft 60. Each bushing 78, 80 is mounted at an end portion of the shaft 60 and is configured to be connected to the vehicle body for supporting the shaft 60, such as being mounting to an inner surface of the front end 16 of the vehicle 18 or some other component in the front end 16. The bushings 78, 80 may be connected in any fashion, and may also be connected by fitment into structures locate them in place. For example, in FIGS. 7 and 8 the bushings 78, 80 are secured to a central bracket 82 connected within the vehicle. The bracket 82 is illustrated with one connector for holding the right-side bushing 80, while the other connector is omitted to see the left-side bushing 78. FIGS. 1 and 2 show the bushings 78, 80 omitted, but they may be included therein also.

An actuator 90 is configured to pivot the first and second couplings 36, 56 of the first and second shutter assemblies 22, 42, respectively, such that the first and second couplings 36, 56 are pivoted simultaneously via the shaft 60 and the first and second angled joints 70, 72 to move the first and second shutter assemblies 22, 42 between the open and closed positions thereof. The actuator 90 in the illustrated embodiment may an electromechanical actuator, such as an electric motor, solenoid, or any other device that pivots its output which in turn causes the pivoted/opening closing action of the shutter assemblies 22, 42. The actuator 90 in other embodiments may also be hydraulically or pneumatically operated. Generally, in most active intake shutter systems, the shutter assemblies are closed when the vehicle exceeds a certain speed, which helps improve the front-end aerodynamics. The shutter assemblies may also be kept closed for a certain period after vehicle start-up, even at low speeds, to avoid intaking air to facilitate the engine or other components warming up faster (also referred to as cold-start situations). The decision to open/close the shutter assemblies may also be dependent on ambient temperature, engine temperature, or the temperature of some other component of interest, like a battery for an electric vehicle or a radiator to increase heat exchange for cooling. The decision on when the open/close the shutter assemblies is typically made in an electric module in the vehicle, such as the vehicle's ECU (engine control unit, or a corresponding control unit for an electric or hybrid vehicle) or BCU (body control unit-if the hardware governing body systems is separate from the ECU), and is sent by an electric control signal to the actuator. The logic for determining when to open/close the shutter assemblies is not intended to be limiting, and these examples are provided for context only.

In the illustrated embodiment, the actuator 90 is included on the first or second shutter assembly 22, 42, and the coupling 36, 56 oriented at an angle for that shutter assembly may be an output coupling 92 of the actuator 90. For example, in FIG. 1 the actuator 90 is included on the second shutter assembly 42, and in FIGS. 7 and 8 the actuator 90 is included on the first shutter assembly 22. When the actuator 90 is included on the second shutter assembly 42, the output coupling 92 provides the coupling 56 for the second shutter assembly 42, which coupling 56 is oriented so its axis is at the angle discussed above and it is engaged with the second shaft coupling 64 to create the angled joint 72, as shown in FIGS. 5 and 6. The actuator 90 has its pivot axis aligned with the axis of the second shutter assembly 42 and the opposing side of the actuator 90, the outboard side (the left side), is connected to the input coupling 58 on the second shutter assembly 42. The actuator output coupling 92 may have a connector 94 shaped in a spur gear configuration inserted into a corresponding shaped receptacle on the inboard (right) side of the actuator 90 for transferring the pivotal movement to the shaft 60 via the angled joint 72. The connector 94 and coupling 56 may be integrally formed as single piece in some embodiments, which is not limiting.

Similarly, when the actuator 90 is included on the first shutter assembly 22, the parts are reversed with the outboard side (now the right side) of the actuator 90 connected to the input coupling 40 of the first shutter assembly 22. Likewise, the output coupling 92 is reversed and provides the coupling 36 for the first shutter assembly 22, which coupling 36 is engaged with the first shaft coupling 62 to create the angled joint 70. Also the connector 94 of the output coupling 92 is inserted into a corresponding shaped receptacle on the inboard (now left) side of the actuator 90 for transferring the pivotal movement to the shaft 60 via the angled joint 70.

In the illustrated embodiment, a shorter shaft 96 is included opposite the actuator 90. In FIGS. 1, 5 and 6, the inner end of the shaft 96 provides the coupling 36 oriented at the angle discussed above for the first shutter assembly 22 and that coupling 36 is received in the shaft coupling 62 to form the angled joint 70, while the outer end 98 of that shaft 96 provides a receptacle for receiving the input coupling 40 for transferring pivotal movement to the first shutter assembly 22. As illustrated, the input coupling 40 has a spur gear configuration while the inside of the shaft outer end 98 receptacle has a matching configuration. The shaft 96 is oriented on the pivot axis of the first shutter assembly 22. In an arrangement like FIGS. 7 and 8 where the actuator 90 is included on the first shutter assembly 22, the shaft 96 is on the opposite side and reversed so its inner end provides the coupling 56 oriented at the angle for the second shutter assembly 42 and that coupling 56 is received in the shaft coupling 64 to form the angled joint 72, while the outer end 98 of that shaft 96 provides a receptacle for receiving the input coupling 58 for transferring pivotal movement to the second shutter assembly 42.

The illustrated embodiment has an advantage of being more flexible in terms of locating the actuator 90 using the same components, which may be needed depending on the location of other vehicle components that may dictate whether the actuator 90 is located on the right or left side. Because the actuator 90 has receptacles for pivotal output on each side that match the spur gear configured parts 40, 58 and 94, the actuator 90 can be placed on either side, i.e., the actuator 90 can have its right side connected to part 40 on the first shutter assembly 22 and its left side connected to part 94 of the output coupling 92 for a right side installation like FIGS. 7 and 8, or the actuator 90 can have its left side connected to part 58 on the second shutter assembly 22 and its right side connected to part 94 of the output coupling 92 for a left side installation like FIGS. 7 and 8. Likewise, the outer end 98 of the shaft 96 is shaped to match both part 40 and 58 and its inner end can serve as either coupling 36 or 56, thus allowing it to be located on either side opposite the actuator 90. This allows all the same components to be used for either a right-side actuator configuration or a left-side actuator configuration.

The construction of using the additional shaft 96 is optional and not intended to be limiting. The construction may be designed for installation in one configuration, particularly if it is known that only one configuration will be selected by the vehicle manufacturer. For example, the shaft 60 could have a longer extent on the side opposite the actuator, or the input to the shutter assembly opposite the actuator 90 could be configured to extend further towards the shaft 60 along its pivot axis without the need for the additional shaft 96. Thus, present application is not limited to the use of the shaft 96.

As another alternative, the actuator 90 could connected directly to the shaft 60 with its drive axis coaxial with the axis of the shaft 60, such as being mounted to a more central area of the shaft 60. Thus, the actuator 90 could also serve the function of providing pivoting action and supporting a central area of the shaft 60. For example, the shaft 60 could be designed to extend through and be rotationally keyed to an opening in the actuator 60. Alternatively, the shaft 60 could be constituted by two segments (smaller shafts) that are coupled at their inner ends to the actuator and have couplings on their outer ends for connection to couplings of the shutter assemblies 22, 42. Thus, the design of the actuator 90, the shaft 60, and the manner in which the actuator 90 transfers pivotal movement to the shutter assemblies 22, 42 is not limiting, and other designs are contemplated.

As can be appreciated, the coupling 36, 56 of the shutter assemblies 22, 42 may be directly on the shutter assembly 22, 42 or indirectly connected to the shutter assembly 22, 42, such as through a shaft 96 or through an actuator 90. The coupling 36, 56 for a shutter assembly 22, 42 can thus be any coupling that is oriented on the axis of its respective shutter assembly 22, 42 and provides for pivotal transfer of motion and is included in the angled joint 70, 72, whether it be receiving application of torque or outputting the transfer of torque. In the illustrated embodiment, the actuator 90 is included on one shutter assembly 22, 42 and thus one coupling 36/56 is outputting torque while the other is receiving torque via the shaft 60. In embodiments where the actuator 90 is not included on a shutter assembly 22, 42 and is axial with respect to the shaft 60, both couplings 36/56 would be receiving torque. Thus, the couplings 36, 56 are not limited to any particular design and the shutter assemblies may have any coupling directly or indirectly connected that is oriented on the axis of its respective shutter assembly 22, 42 and provides for pivotal transfer of motion and is included in the angled joint 70, 72.

The pivotal connections discussed herein, such as the spur gear configurations for parts 40, 58, 94 and any corresponding receptacles on part 98 or the drive connections on the actuator 90, are not intended to be limiting. Any connection suitable for transferring pivotal motion may be used. For example, one or more of the illustrated connections may be reversed, or any irregular shape like a square cross-section, half-circle cross-section, etc. that rotationally keys the parts together for pivotal movement may be used.

Figure 9:
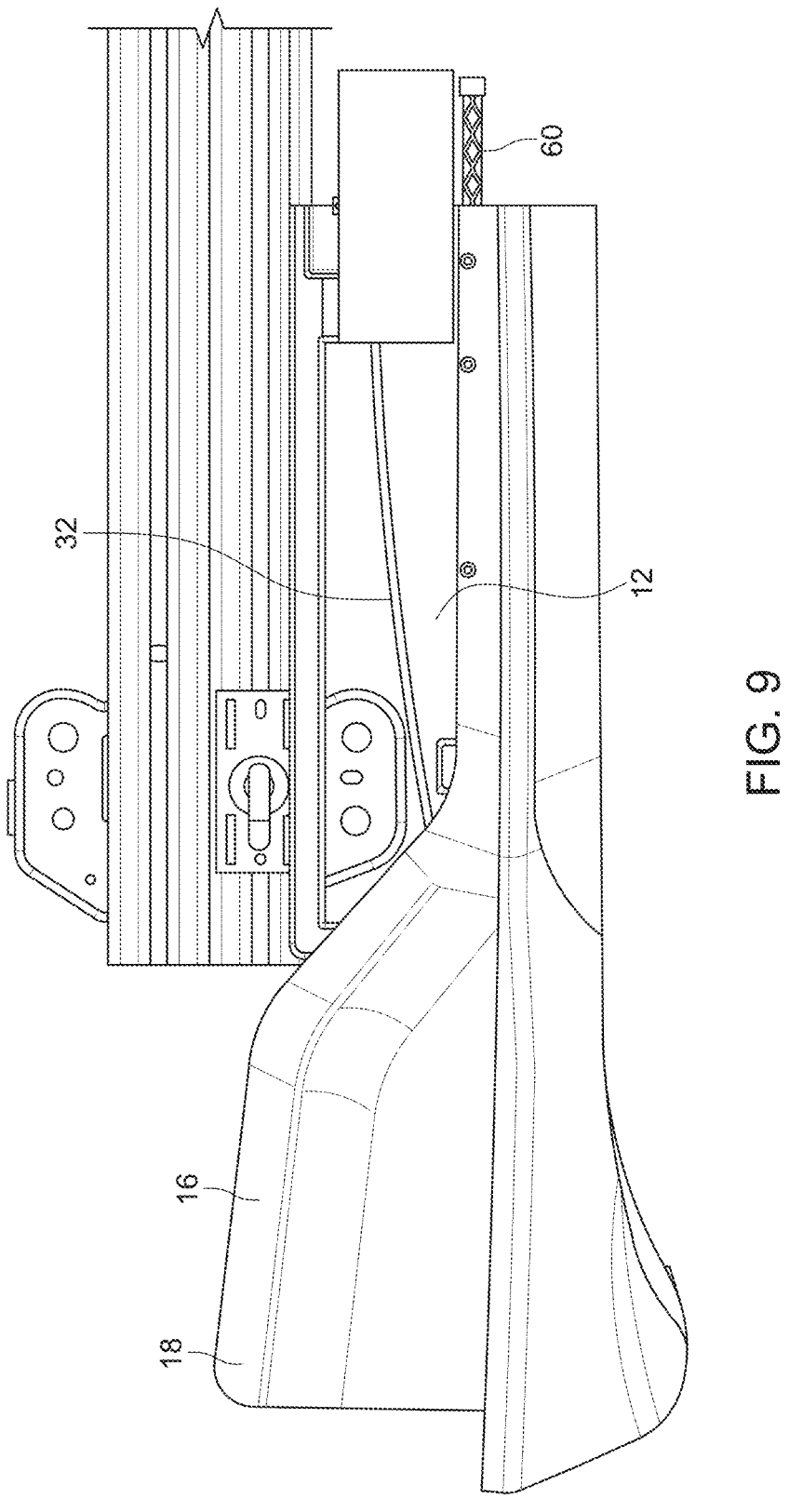
FIG. 9 is a view for comparison showing a design where angled joints are not used and the shutter axes are only in the lateral direction of the vehicle, showing the positioning of a shutter in the open position.
Figure 10:
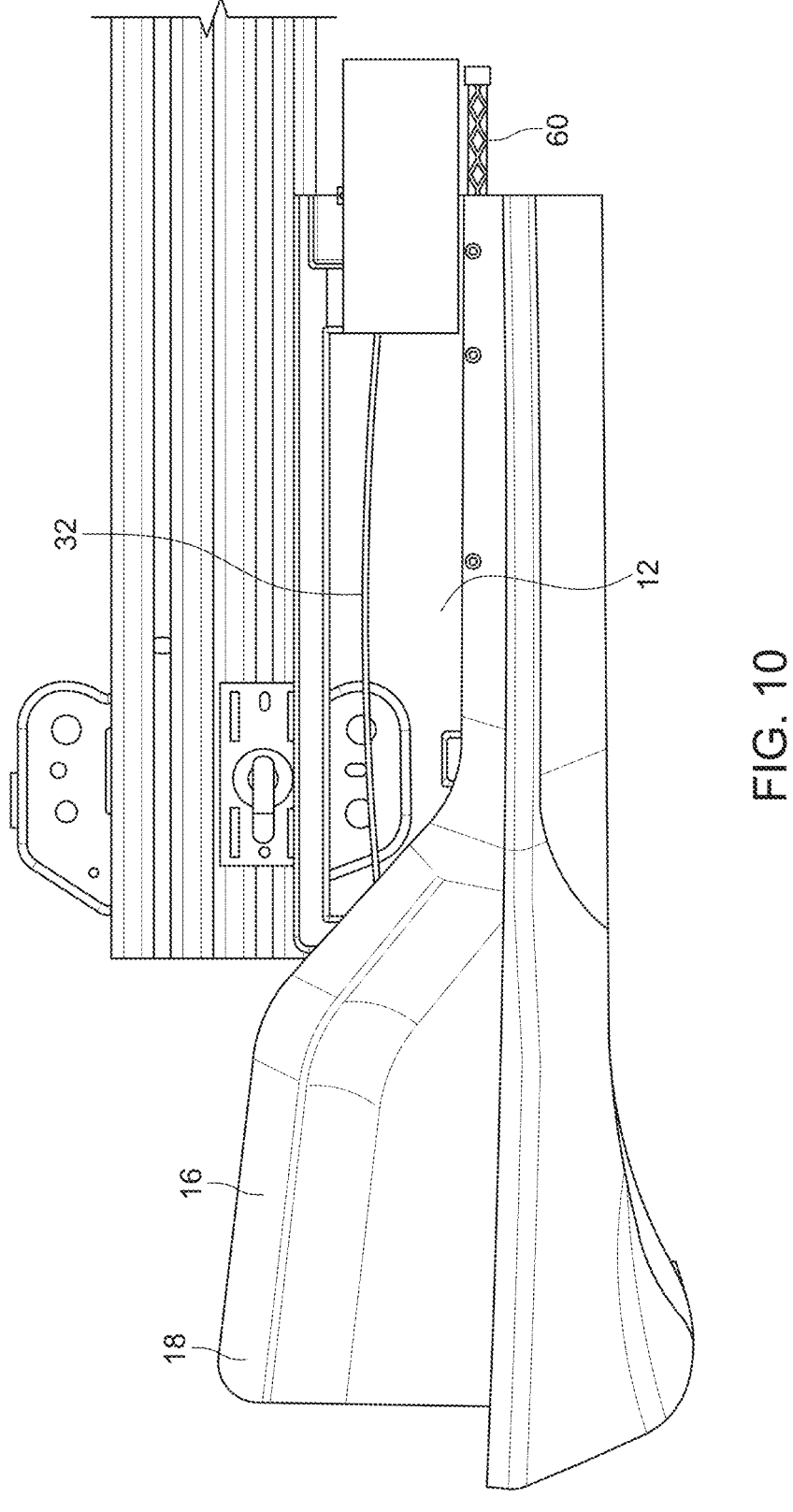
FIG. 10 is a view similar to FIG. 9 for comparison where angled joints are used, also showing the positioning of a shutter in the open position.

FIGS. 9 and 10 show a comparison between two active air shutter systems of the same basic design, with FIG. 9 being a design where the angled joints (i.e. the shutter axes are in the lateral direction of the vehicle) are not used and FIG. 10 is an embodiment as discussed above with the angled joints. In both FIGS. 9 and 10, the shutter forms a visible part of the vehicle front end's exterior, and thus its shaping is designed to follow the contour of the vehicle front end surface. In FIG. 9, due to the curvature of the shutter matching the intake 14, which follows the vehicle front end curvature, when the shutter is in the open position it is oriented at an angle to horizontal. From a functional standpoint, this tends to deflect the incoming air more towards the vehicle center, which may not be desired depending on the location of the internal components that benefit from airflow. From an aesthetic standpoint, this is also less desirable, as it may appear awkward and not in accordance with the vehicle front end styling and shaping, especially in vehicle designs with no grill work over the air intake in which the shutter is more easily seen. In contrast, with the design in FIG. 10 where angled joints are used, the shutter has a more horizontal attitude, which allows the air to flow more straight through the air intake 14 and also appears more in-line with the vehicle front end styling and shaping. This comparison is not intended to be limiting or disclaim any particular orientation, as those may vary based on the structure of the vehicle and how closely the intake shutter is designed to match the vehicle exterior. In designs where the shutters are behind grill work and are not part of the vehicle front end fascia surface, such differences may be less of an issue. Thus, this comparison is for illustrative purposes and not limiting.

Figure 11:
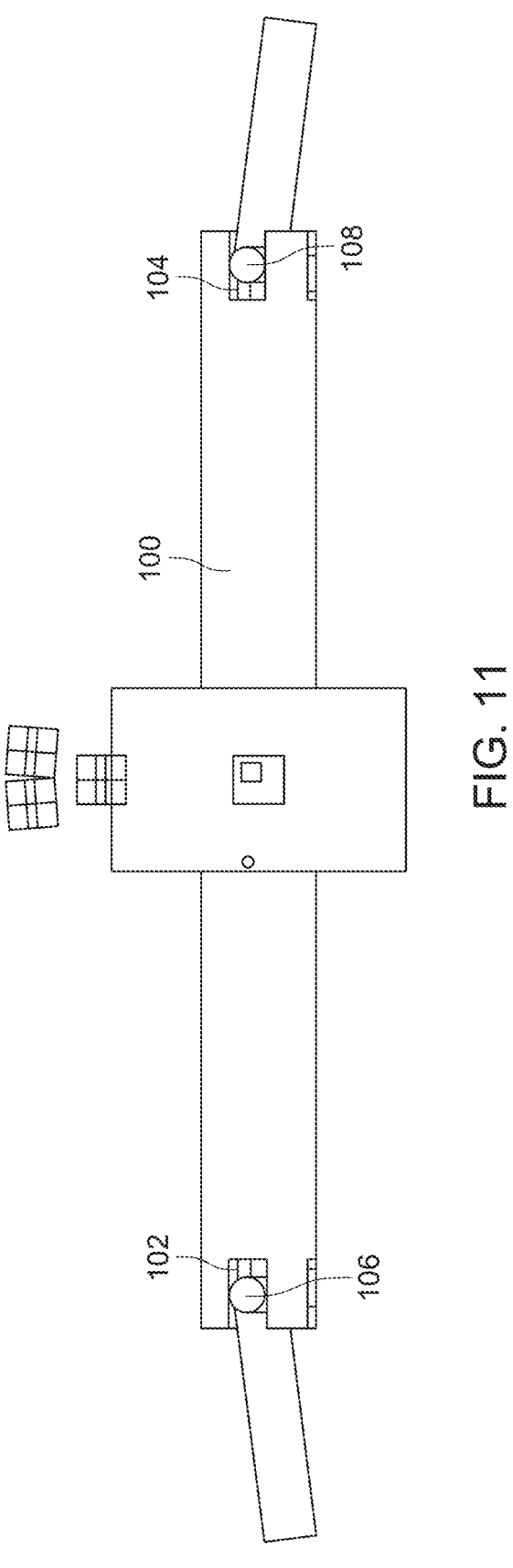
FIG. 11 is an alternative angled joint design.

As mentioned above, the angled joints 70, 72 may have other configurations. FIG. 11 shows an alternative configuration. In FIG. 11, a cylindrical shaft 100 is used and each end thereof has a set of four slots 102, 104. The angled joints 70, 72 may be formed by X-shaped members 106, 108 engaged in the slots 102, 104, which also constitutes a constant velocity joint functioning in the same manner as discussed above.

Although the illustrated embodiment has two intake openings 12, 14, that number is also not limiting. For example, the front end 16 could have three openings, including a center opening that is aligned with the central front-rear axis of the vehicle, and a pair of openings on each lateral side thereof that are angled relative to one another to extend in both the rearward and lateral directions of the vehicle 18. Thus, the system 10 described herein could be extended to operate intake shutters on all three openings with one actuator, a shaft and angled joints connecting the center set of intake shutters and the right set of intake shutters, and another shaft and angled joints connecting the center set of intake shutters and the left set of intake shutters. Similarly, the same approach could be extended to operate intake shutters on four openings, and so on. Thus, the present application is not limited to the embodiment applied to two intake openings 12, 14.

The present applications contemplates that embodiments may be delivered in disassembled or partially assembled form for final assembly at the time of installation to the vehicle front end. Thus, the application includes and covers embodiments that are delivered or shipped in disassembled or partially assembled form, and does not require actual connection of all components for operation until final installation.

The foregoing illustrated embodiment has been provided solely to illustrate the structural and functional principles of the present application and is not intended to be limiting. To the contrary, the present application encompasses all alterations, modifications, substitutions and equivalents within the spirit and scope of the following claims.

12

What is claimed:

1. An active vehicle air intake shutter system for installation at first and second air intake openings on a front end of a motor vehicle, the openings being angled relative to one another to extend in both rearward and lateral directions of the motor vehicle, comprising:

a first intake shutter assembly for mounting at the first air intake opening, the first intake shutter assembly being movable between a closed position blocking airflow through the first air intake opening and an open position permitting airflow through the first air intake opening, wherein the first intake shutter assembly has a first coupling such that pivotal movement of the first coupling moves the first intake shutter assembly between the open and closed positions;

a second intake shutter assembly for mounting at the second air intake opening, the second intake shutter assembly being movable between a closed position blocking airflow through the second air intake opening and an open position permitting airflow through the second air intake opening, wherein the second intake shutter assembly has a second coupling such that pivotal movement of the second coupling moves the second intake shutter assembly between the open and closed positions;

a shaft having an axis for extending in the lateral direction of the vehicle, the shaft comprising a first shaft coupling and a second shaft coupling each oriented axially with respect to the shaft axis;

the first shaft coupling being configured to connect to the first coupling of the first intake shutter assembly at an angle to define a first angled joint wherein the first shaft coupling and the first coupling transfer pivotal movement therebetween without changing the angle therebetween; the second shaft coupling being configured to connect to the second coupling of the second intake shutter assembly at an angle to define a second angled joint wherein the second shaft coupling and the second coupling transfer pivotal movement therebetween without changing the angle therebetween; and an actuator configured to pivot the first and second couplings of the first and second intake shutter assemblies, respectively, such that the first and second couplings are pivoted simultaneously via the shaft and the first and second angled joints to move the first and second intake shutter assemblies between the open and closed positions thereof.

2. The active vehicle air intake shutter system according to claim 1, further comprising a pair of bushings, each bushing being mounted at an end portion of the shaft and being configured to be connected to a vehicle body for supporting the shaft.

3. The active vehicle air intake shutter system according to claim 1, wherein each of the first and second shaft couplings has an X-shaped female connector defined by a pair of perpendicular slots on an axial face thereof, and wherein each of the first and second couplings of the first and second intake shutter assemblies has an X-shaped male connector for being slidably received in the respective X-shaped female connector to maintain the angle of the respective angled joint.

4. The active vehicle air intake shutter system according to claim 1, wherein the actuator is included on the first intake shutter assembly and the first coupling of the first intake shutter assembly is an output coupling of the actuator.

5. The active vehicle air intake shutter system according to claim 1, wherein the first and second angled joints are each a constant velocity joint.

6. A motor vehicle comprising:

a front end with first and second air intake openings, the openings being angled relative to one another to extend in both rearward and lateral directions of the motor vehicle; and an active vehicle air intake shutter system installed at the first and second air intake openings, the active vehicle air intake shutter system comprising:

a first intake shutter assembly mounted at the first air intake opening, the first intake shutter assembly being movable between a closed position blocking airflow through the first air intake opening and an open position permitting airflow through the first air intake opening, wherein the first intake shutter assembly has a first coupling such that pivotal movement of the first coupling moves the first intake shutter assembly between the open and closed positions;

a second intake shutter assembly mounted at the second air intake opening, the second shutter assembly being movable between a closed position blocking airflow through the second air intake opening and an open position permitting airflow through the second air intake opening, wherein the second intake shutter assembly has a second coupling such that pivotal movement of the second coupling moves the second intake shutter assembly between the open and closed positions;

a shaft having an axis extending in the lateral direction of the vehicle, the shaft comprising a first shaft coupling and a second shaft coupling each oriented axially with respect to the shaft axis;

the first shaft coupling being connected to the first coupling of the first intake shutter assembly at an angle to define a first angled joint wherein the first shaft coupling and the first coupling transfer pivotal movement therebetween without changing the angle therebetween;

the second shaft coupling being connected to the second coupling of the second intake shutter assembly at an angle to define a second angled joint wherein the second shaft coupling and the second coupling transfer pivotal movement therebetween without changing the angle therebetween; and an actuator configured to pivot the first and second couplings of the first and second intake shutter assemblies, respectively, such that the first and second couplings are pivoted simultaneously via the shaft and the first and second angled joints to move the first and second intake shutter assemblies between the open and closed positions thereof.

7. The motor vehicle according to claim 6, wherein the active vehicle air intake shutter system further comprises a pair of bushings, each bushing being mounted at an end portion of the shaft and being configured to be connected to a vehicle body for supporting the shaft.

8. The motor vehicle according to claim 6, wherein each of the first and second shaft couplings has an X-shaped female connector defined by a pair of perpendicular slots on an axial face thereof, and wherein each of the first and second couplings of the first and second intake shutter assemblies has an X-shaped male connector for being slidably received in the respective X-shaped female connector to maintain the angle of the respective angled joint.

9. The motor vehicle according to claim 6, wherein the actuator is included on the first intake shutter assembly and the first coupling of the first intake shutter assembly is an output coupling of the actuator.

10. The motor vehicle according to claim 6, wherein the first and second angled joints are each a constant velocity joint.

* * * * *